United States Patent [19]

Eisenloeffel

[11] Patent Number: 4,615,402
[45] Date of Patent: Oct. 7, 1986

[54] DRILL BIT AND EXTENSION ADAPTER

[76] Inventor: Adolf Eisenloeffel, 6298 Adair Dr., Brookpark, Ohio 44142

[21] Appl. No.: 742,769

[22] Filed: Jun. 10, 1985

[51] Int. Cl.$^4$ ............................................. E21B 10/00
[52] U.S. Cl. ..................... 175/320; 299/92; 279/103; 403/326; 403/327; 285/379
[58] Field of Search ................ 175/320, 323; 403/326, 403/327, 328; 285/319; 279/19.3, 103; 299/92

[56] References Cited

U.S. PATENT DOCUMENTS

| | | | |
|---|---|---|---|
| 3,005,620 | 10/1961 | Trunnell | 285/319 |
| 3,347,575 | 10/1967 | Morris | 285/319 |
| 3,548,425 | 12/1970 | Goldstein | 403/326 |
| 3,643,988 | 2/1972 | Inguartsen | 403/326 |
| 3,832,075 | 8/1974 | Arai | 403/328 |
| 4,327,947 | 5/1982 | Bower, Jr. | 299/92 |
| 4,484,783 | 11/1984 | Emmerich | 299/92 |

Primary Examiner—James A. Leppink
Assistant Examiner—William P. Neuder
Attorney, Agent, or Firm—Harlan E. Hummer

[57] ABSTRACT

An adapter for detachably mounting a drill bit on an extension, is described as having a button-type catch with outwardly diverging flanges, and a separate, split ring of spring steel for exerting a spring biasing force against the button catch. The button catch is seated in a recess which is formed in the split ring. In another embodiment of the invention, the split ring is provided with a protruding finger for initially holding the button catch, so that it can be easily inserted within the bore of the drill bit extension, prior to the final positioning of the adapter within the bore.

16 Claims, 8 Drawing Figures

DRILL BIT AND EXTENSION ADAPTER

BACKGROUND OF THE INVENTION

The invention relates to an assembly of a drill bit and extension which is used in mining operations, and especially the adapter by which the drill bit is detachably mounted on the extension.

Conventional drill bit and extension assemblies have communicating bores through which dust is removed from around the drill bit during a drilling operation, or water is pumped to the drill bit to facilitate drilling of the material. The drill bit and extension are provided with aligned holes which are disposed crosswise in the two components. The adapter consists of a ball or button-type catch which is positioned in the aligned holes to hold the drill bit and extension together and a spring clip for spring loading or biasing the button catch in interlocked relation with the drill bit and extension.

The major problem is that the spring clip loses its resiliency after a period of hard and extended use, so that the adapter must be removed and replaced. The invention is designed to provide a unique adapter which has highly improved spring characteristics.

Briefly stated, the invention is in an adapter which comprises a button-type catch and a separate, cylindrical split ring for spring loading the button catch. The preferred embodiment of the invention includes a parti-cylindrical finger which extends longitudinally of the split ring and on which the button catch is initially positioned for easy insertion in the hole of the drill bit extension prior to sliding the split ring into the bore of the extension.

DESCRIPTION OF THE DRAWING

The following description of the invention will be more easily understood by having reference to the accompanying drawing, wherein.

ENVIRONMENT OF THE INVENTION

Figure 1:
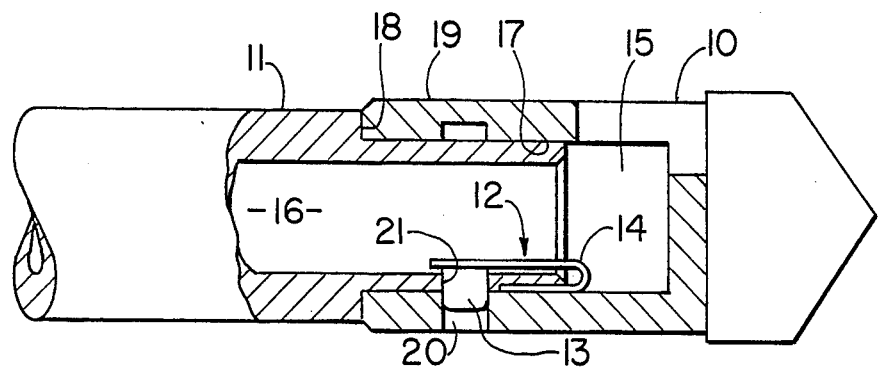
FIG. 1 is a longitudinal cross-section of a drill bit and extension assembly with a prior art adapter.

With general reference to the drawing for like parts, and particular reference to FIG. 1, there is shown a conventional drill bit 10 which is detachably mounted in axially aligned relation on a drill bit extension 11 by means of a prior art adapter 12 which is comprised of a metal, button-type catch 13 which is secured to a reversely bent, spring clip 14 which is made of light-weight spring steel. The drill bit 10 and extension 11 are hollow, and have communicating bores 15 and 16 through which dust is removed from around the forward cutting edge of the drill bit 10, or water is pumped to the cutting edge of the drill bit 10 during a drilling operation. The drill bit extension 11 has a multi-sided tip 17 with a surrounding shoulder 18 which acts as a stop against which the drill bit 10 abuts when it is properly positioned on the extension 11. Each of the outer sides are flat and extend longitudinally of the extension 11. The drill bit 10, likewise, has a matingly shaped, multi-side bore end 19 which slidably fits over the tip 17 of the extension 11. In this way, the drill bit 10 is prevented from rotating about its longitudinal axis. The drill bit 10 and extension 11, when mounted together, have a pair of axially aligned crosswise openings or holes 20 and 21 which are designed to receive the button 13 which has an outer diameter that is slightly less than the inside diameters of the aligned holes 20 and 21, so that the drill bit 10 will fit snugly on the extension 11.

The adapter 12 of FIG. 1 is well known in the industry as a Valco snap-button retainer which is manufactured and sold by the Valco/Valley Tool & Die, Inc. of Cleveland, Ohio. This particular retainer or fastener is economical to manufacture, easy to install on a drill bit extension 11, simple to remove and replace, and has excellent holding power. Unfortunately, the spring clip 14, after prolonged use, loses its effectiveness in retaining the button 13 within the hole 20 of the drill bit 10 which would be lost in the hole being drilled, if this happens during the drilling operation. It can be appreciated that a worn and ineffective adapter 12 can be easily removed by depressing the button 13 to free the drill bit 10 from the extension 11, after which the defective adapter is replace with a new one.

Figure 2:
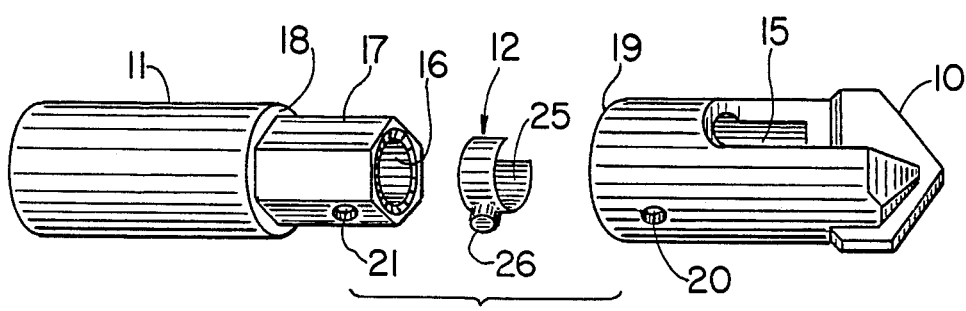
FIG. 2 is an exploded view of a similar drill bit and extension assembly with another prior art adapter.

With reference to FIG. 2, the prior art adapter 12 is comprised of a C-shaped, cylindrical split ring 25 which is integrally formed with a protruding ball or button 26. The split ring 25 is composed of spring steel and has an outer diameter which closely approximates that of the bore 16 in which the split ring 25 is positioned, so that the ring 25 will provide minimal resistance to the flow of dust or water through the bore 16 of the extension 11. It can be appreciated by those skilled in the art, that because of the relatively large size of the button 26, the split ring 25 must be severely distorted to insert the adapter 12 into position within the bore 16 of the extension, where the button 26 snaps into position in the hole 21 from which it protrudes for locking into place in the hole 20 of the drill bit 10 when the drill bit 10 is slid onto the tip 17 of the extension 11. This distortion of the spring ring 25 radically affects the spring-loading effectiveness of the split ring 25. Thus the integrity of the adapter 12 is at least partially destroyed during the insertion of the adapter 12. This distortion of the split ring 25 can be substantially reduced or eliminated by reducing the size of the button 26, but then the holding power of the button 26 is seriously affected. The following invention protects the integrity of the adapter 12 and optimises the size of the button and the spring-loading characteristics of the split ring.

THE INVENTION

Figure 3:
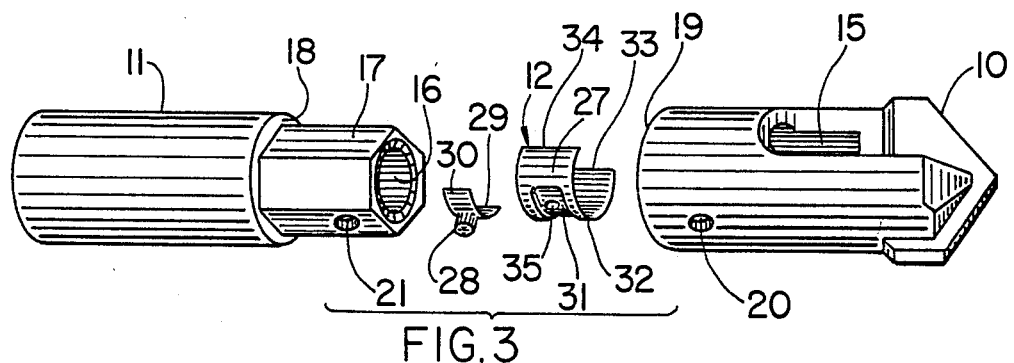
FIG. 3 is a similar exploded view of a drill bit and extension assembly with an adapter which is made in accordance with the invention.
Figure 4:
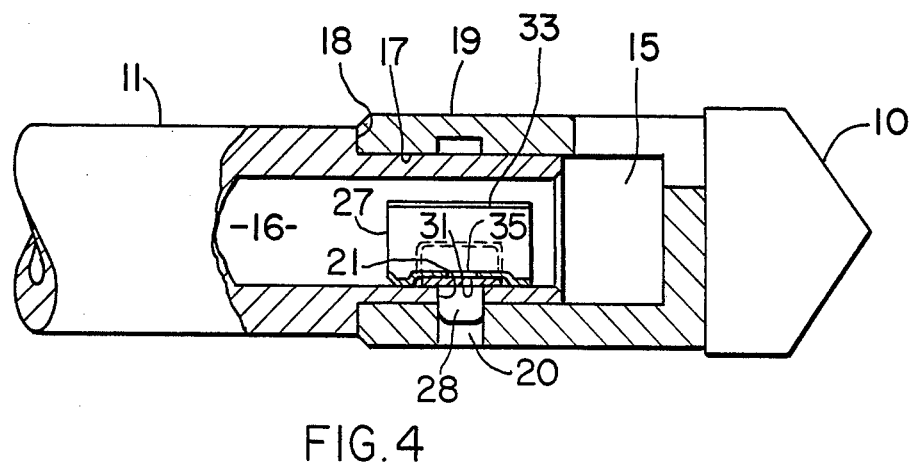
FIG. 4 is a longitudinal cross-section of the adapter of FIG. 3.

With reference to FIGS. 3 and 4, there is shown an adapter 12 which comprises two individual parts; namely, a C-shaped, split cylindrical ring 27 of spring steel, and a ball or button-type catch 28 which is composed of similar material and which is separate from the split ring 27. The button 28 is provided with a pair of oppositely disposed parti-cylindrical flanges 29 and 30 which generally diverge from the button 28 and which are designed to be received in a matingly shaped convex recess 31 which is formed in the outer curved surface 32 of the split ring 27, midway between the opposing, longitudinal marginal edges 33 and 34 of the split ring 27. The recess 31 is provided with a center opening 35 for visually observing that the button 28 and split ring 27 are properly positioned together where the wing flanges 29 and 30 are snugly seated in the recess 31. The drill bit 10 and extension 11 are assembled by positioning the separate button 28 within the hole 21 of the extension 11. The split ring 27 is then pinched slightly together and slid into the bore 16 of the extension 11, until the wing flanges 29 and 30 are properly positioned in the recess 31 of the split ring 27. The button 28 is then depressed and the drill bit 10 slid onto the tip 17 of the extension 11 until the button 28 snaps into the hole 20 of the drill bit 10 which is in abutting relation with the annular shoulder 18 that is formed in the extension 11 adjacent the tip 17. It can be appreciated that the integrity of this particular adapter is not compromised in any way, and the size of the button 28 and the spring-loading characteristics of the split ring 27 are optimised. Moreover, the provision of the recess 31 produces a continuous, smooth contour for the outer and inner surfaces of the split ring 27, so that the flow of fluid through the bore 16 of the extension 11 is unimpeded. Further, the wing flanges 29 and 30 coact with the adjacent slides of the recess 31, to stabilize the position of the split ring 27 within the bore 16. The only problem with this adapter 12 is the inconvenience of initially inserting the adapter 12, in position, on the drill bit extension 11, and the removal and replacement of the adapter 12 should it ever become worn to the point of replacement. The following described adapter provides a simple, unique mechanism whereby the adapter is easily mounted within the drill bit extension.

With particular reference to FIGS. 5–8, there is shown an adapter 12 which comprises a C-shaped, split ring 40 of spring steel and a ball or button-type catch 41 which is also provided with a pair of similar, parti-cylindrical wing flanges 42 and 43 (not shown, but similar to flange 29 in FIG. 3). The split ring 40 includes a parti-cylindrical finger 44 which extends longitudinally of the split ring 40 and acts to hold the button 41 for easy insertion into the hole 21 of the drill bit extension 11, prior to sliding the split ring 40 within the bore 16 of the extension 11.

Figure 5:
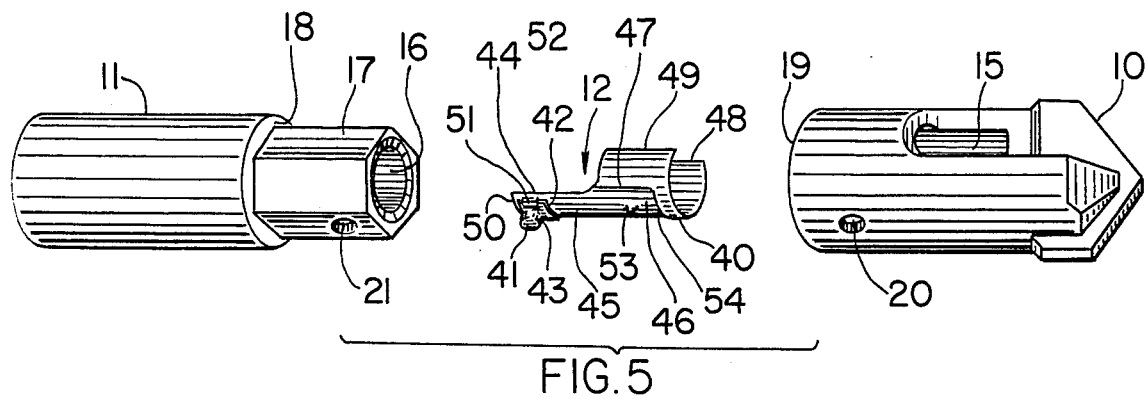
FIG. 5 is a similar exploded view of a drill bit and extension assembly with another embodiment of the invention.
Figure 6:
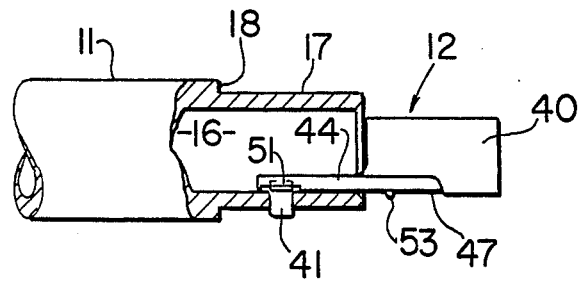
FIGS. 6-8 are different cross-sections of the assembly and adapter of FIG. 5, all of which sections are designed to show the successive steps in positioning the adapter and drill bit on the extension.

The button positioning finger 44 has an outer, curved surface 45 which is a smooth continuation of the outer curved surface 46 of a longitudinally extending rectangular recess 47 that is formed in the split ring 40 midway between the opposing, longitudinal marginal edges 48 and 49 of the split ring 40. The finger 44 has a free distal end 50. A pair of tabs 51 and 52 (not shown) are punched upwardly out of the opposite sides of the finger 44 in converging relation to form slots for slidably receiving the wing flanges 42 and 43, such that, when the button 41 is properly, in position, on the finger 44, the tabs 51 and 52 are in overlapped, juxtaposed relation with the wing flanges 43 and 44 of the button 41, as best seen in FIG. 5. A small detent 53 is provided on the outer surface 46 of the recess 47 in spaced relation from the opposing end 54 of the recess 47 to, in effect, act as a stop which coacts with the wing flanges 42 and 43 to hold the button 41 snugly, in position, in the recess 47 of the split ring 40.

Figure 7:
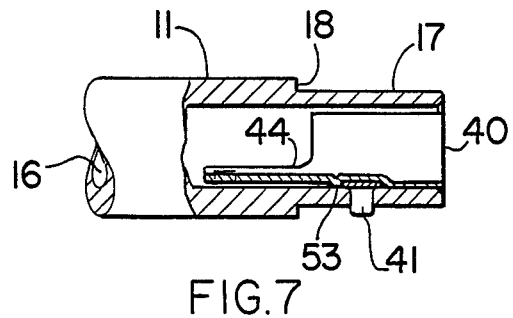
Figure 8:
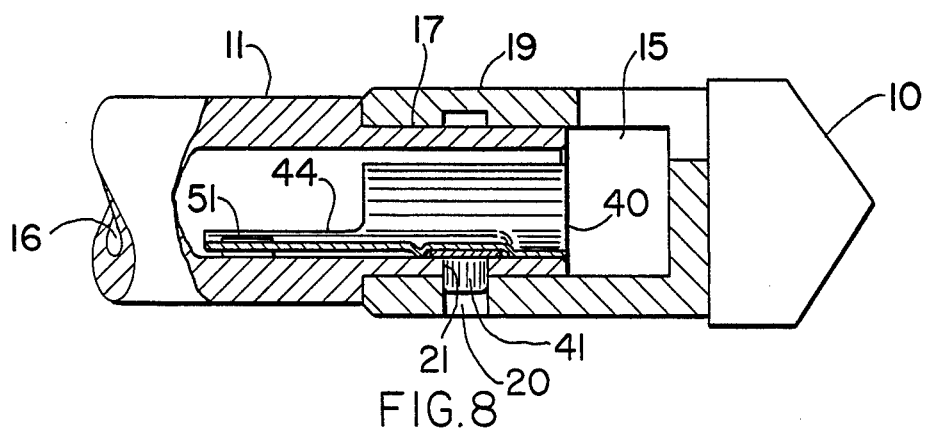

The button 41 and wing flanges 42 and 43 are initially positioned within the tabs 51 and 52 adjacent the free distal end 50 of the finger 44 which is then inserted within the bore 16 of the extension 11, until the button 41 drops into the hole 21 of the extension 11. (Note in FIG. 6 that the finger 44 is sufficiently long, so that when the button 41 is in the hole 21 of the extension 11, the split ring 40 will be in substantially abutting relation with the tip 17 of the extension 11). The split ring 40 is then pinched slightly together and slid into the bore 16 of the extension 11 (FIG. 7). As the split ring 40 is pushed into the bore 16, the button 41, held within the hole 21, slides longitudinally along the outer surface 45 of the finger 44 towards the recess 47, until, as seen in FIG. 7, the split ring 40 is properly positioned within the bore 16 and the wing flanges 42 and 43 are seated within the recess 47 between the detent or stop 53 and the opposing end 54 of the recess 47. The button 41 is then depressed and the drill bit 10 moved into position where the button 41 snap locks into the hole 20 of the drill bit 10, as seen in FIG. 8. The aforementioned process is reversed when the adapter 21 needs replacement.

Thus, there has described a unique adapter, wherein the size of the snap lock button and the spring loading characteristics of the split ring are optimised, since the split ring needs little or no distortion to be inserted within the bore of the drill bit extension. Further, the adapter is provided with a button holding finger for quick and easy positioning of the adapter in the drill bit extension and subsequent attachment of the drill bit on the extension. The extended finger is only wide enough to hold and support the button and, unlike the split ring, does not need to be distorted to enter the bore of the extension.

What is claimed is:

1. An adapter which is used to detachably mount a drill bit on an extension, comprising:
   (a) a button-type catch which includes a button with a pair of outwardly extending flanges;
   (b) a C-shaped split cylindrical ring, separate from the flanged button catch, for spring loading the flanged button catch; and
   (c) means intermediate opposing marginal edges of the split ring for retaining the flanged button catch, in position, in unattached relation on the split ring, when the adapter, drill bit and extension are joined together in an assembly, the means including (i) a recess in the split ring for removably receiving the flanged button catch, and (ii) means for restraining the flanged button catch in the recess.

2. The adapter of claim 1, wherein the button catch includes a pair of flanges which diverge from the button catch and which are designed to rest in the recess formed in the slpit ring.

3. The adapter of claim 2, which includes means extending from the split ring for removably holding the button catch for easy insertion in a hole which extends crosswise of the extension adjacent the end of the extension closer the drill bit.

4. An adapter which is used to detachably mount a drill bit on an extension comprising:
   (a) a button-type metallic catch having a pair of oppositely extending parti-cylindrical flanges which generally diverge in a direction away from the button catch; and
   (b) a C-shaped, split cylindrical ring, separate from the button catch, for spring loading the button catch, the ring being composed of lightweight spring steel and having a generally rectangular recess disposed therein midway between opposing longitudinal marginal edges of the split ring, the recess having an outer cylindrical surface against which the button catch is seated when the drill bit, extension, and adapter are assembled, the split ring including: (c) a finger which extends longitudinally from the split ring, the finger having an outer cylindrical surface which is a continuation of the outer cylindrical surface of the recess, the outer surface of the finger designed to slidably support the button catch as it moves towards the recess;

(d) a pair of tabs punched from the finger upwardly above the outer cylindrical surface of the finger in converging relation for removably holding the flanges and attached button catch between them; the tabs being adjacent the free distal end of the finger, and (e) a detent extending upwardly above the outer cylindrical surface in spaced relation from the opposite side of the recess and coacting therewith to limit relative longitudinal movement between the button catch and split ring when the button catch is seated in the recess.

5. The adapter of claim 4, wherein the finger is only wide enough to hold and support the button and, unlike the split ring, does not need to be distored to enter the bore.

6. In combination:
(a) a drill bit having a cutting edge and a centrally disposed bore which extends longitudinally of the drill bit and has an opening in the cutting edge, so that liquid pumped through the bore, can contact the cutting edge, the bore, at least at the end thereof opposite the cutting edge, being multi-sided, each of which sides are flat, the drill bit having a hole crosswise therein communicating with the bore between the cutting edge and opposing end of the drill bit;

(b) a drill bit extension having a longitudinally extending bore for communication with the bore of the drill bit when the extension and drill bit are coupled together, the extension having a multi-sided end for mating reception in the multi-sided bore end of the drill bit, the extension having an annular shoulder which surrounds the multi-sided end against which the drill bit abuts when the drill bit and extension are coupled together, the extension also having a hole crosswise therein communicating with the bore thereof, the hole of the extension being designed to be axially aligned with the hole of the drill bit when the drill bit and extension are coupled together where the drill bit abuts the shoulder of the extension;

(c) an adapter for detachably coupling the drill bit on the extension in axially aligned relation, the adapter, comprising:

(d) a button-type catch for insertion in the aligned holes of the drill bit and extension to hold them together, the catch including a button with a pair of outwardly extending flanges;

(e) a C-shaped, split cylindrical ring, separate from the flanged button catch, for spring loading the flanged button catch; and (f) means intermediate opposing marginal edges of the split ring for retaining the flanged button catch, in position, in unattached relation on the split ring, when the adapter, drill bit and extension are joined together in an assembly, the means including (i) a recess in the split ring for removably receiving the flanged button catch, and (ii) means for restraining the flanged button catch in the recess.

7. The combination of claim 6, wherein the button catch includes a pair of flanges which diverge from the button catch and which are designed to rest in the recess formed in the split ring.

8. The combination of claim 7, which includes means extending from the split ring for removably holding the button catch for easy insertion in a hole which extends crosswise of the extension adjacent the end of the extension closer the drill bit.

9. In combination:
(a) a drill bit having a cutting edge and a centrally disposed bore which extends longitudinally of the drill bit and has an opening in the cutting edge, so that liquid pumped through the bore, can contact the cutting edge, the bore, at least at the end thereof opposite the cutting edge, being multi-sided, each of which sides are flat, the drill bit having a hole crosswise therein communicating with the bore between the cutting edge and opposing end of the drill bit.

(b) a drill bit extension having a longitudinally extending bore for communication with the bore of the drill bit when the extension and drill bit are coupled together, the extension having a multi-sided end for mating reception in the multi-sided bore end of the drill bit, the extension having an annular shoulder which surrounds the multi-sided end and against which the drill bit abuts when the drill bit and extension are coupled together, the extension also having a hole crosswise therein communicating with the bore thereof, the hole of the extension being designed to be axially aligned with the hole of the drill bit when the drill bit and extension are coupled together where the drill bit abuts the shoulder of the extension.

(c) an adapter for detachably mounting the drill bit in aligned relation on the extension, the adapter comprising:

(I) a button-type metallic catch for insertion in the aligned holes of the drill bit and extension to hold them together, the button catch having a pair of oppositely extending parti-cylindrical flanges which generally diverge in a direction away from the button catch.

(II) a C-shaped, split cylindrical ring, separate from the button catch, for spring loading the button catch, the ring being composed of lightweight spring steel and having a generally rectangular recess disposed therein midway between opposing longitudinal marginal edges of the split ring, the recess having an outer cylindrical surface against which the button catch is seated when the drill bit, extension, and adapter are assembled, the split ring including:

(III) a finger which extends longitudinally from the split ring, the finger having an outer cylindrical surface which is a continuation of th outer cylindrical surface of the recess, the outer surface of the finger designed to slidably support the button catch as it moves towards the recess;

(IV) a pair of tabs punched from the finger upwardly above the outer cylindrical surface of the finger in converging relation for removably holding the flanges and attached button catch between them; the tabs being adjacent the free distal end of the finger, and (V) a detent extending upwardly above the outer cylindrical surface in space relation from the opposite side of the recess and coacting therewith to limit relative longitudinal movement between the button catch and split ring when the button catch is seated in the recess.

10. The combination of claim 9, wherein the finger is only wide enough to hold and support the button and, unlike the split ring, does not need to be distorted to enter the bore.

11. An adapter which is used to detachably mount a drill bit on an extension, comprising:
   (a) a button-type catch having a pair of diverging flanges;
   (b) a C-shaped, split cylindrical ring, separate from the button catch, for spring loading the button catch, the ring having an outer curved surface in which is formed a recess for receiving the flanges of the catch;
   (c) means intermediate opposing marginal edges of the split ring for retaining the button catch, in position, on the split ring, when the adapter drill bit and extension are joined together in an assembly; and
   (d) means extending from the split ring for removably holding the button catch for easy insertion in a hole which extends crosswise of the extension adjacent the end of the extension closer the drill bit, the holding means including, (I) a finger with a particylindrical surface which is an extension of the outer surface of the recess, the finger having a free distal end spaced from the split ring and a proximal end secured to the split ring, (II) means adjacent the distal end of the finger for coaction with the flange of the button catch to removably hold the button catch, and (III) means adjacent the proximal end of the finger for preventing relative longitudinal movement between the button catch and split ring, when the adapter, drill bit and extension are assembled together.

12. The adapter of claim 11, wherein the holding means adjacent the distal end of the finger includes a pair of oppositely disposed tabs which converge upwardly above the outer curved surface of the finger in the direction of the upstanding button catch, the tabs being in overlapped, juxtaposed relation with the flanges, when the button catch is, in position, on the finger.

13. The adapter of claim 12, wherein the button catch movement preventing means includes a detent projecting upwardly above the outer surface of the recess.

14. In combination:
   (a) a drill bit having a cutting edge and a centrally disposed bore which extends longitudinally of the drill bit and has an opening in the cutting edge, so that liquid pumped through the bore, can contact the cutting edge, the bore, at least at the end thereof opposite the cutting edge, being multi-sided, each of which sides are flat, the drill bit having a hole crosswise therein communicating with the bore between the cutting edge and opposing end of the drill bit;
   (b) a drill bit extension having a longitudinally extending bore for communication with the bore of the drill bit when the extension and drill bit are coupled together, the extension having a multi-sided end for mating reception in the multi-sided bore end of the drill bit, the extension having an annular shoulder which surrounds the multi-sided end and against which the drill bit abuts when the drill bit and extension are coupled together, the, the extension also having a hole crosswise therein communicating with the bore thereof, the hole of the extension being designed to be axially aligned with the hole of the drill bit when the drill bit and extension are coupled together where the drill bit abuts the shoulder of the extension;
   (c) an adapter for detachably coupling the drill bit on the extension in axially aligned relation, the adapter, comprising:
   (d) a button-type catch for insertion in the aligned holes of the drill bit and extension to hold them together, the button catch having a pair of diverging flanges;
   (e) a C-shaped, split cylindrical ring, separate from the button catch, for spring loading the button catch, the ring having an outer curved surface in which is formed a recess for receiving the flanges of the catch;
   (f) means intermediate opposing marginal edges of the split ring for retaining the button catch, in position, on the split ring, when the adapter, drill bit and extension are joined together in an assembly; and
   (g) means extending from the split ring for removably holding the button catch for easy insertion in a hole which extends crosswise of the extension adjacent the end of the extension closer the drill bit, the holding means including, (I) a finger with a particylindrical surface which is an extension of the outer surface of the recess, the finger having a free distal end spaced from the split ring and a proximal end secured to the split ring, (II) means adjacent the distal end of the finger for coaction with the flanges of the button catch to removably hold the button catch, and (III) means adjacent the proximal end of the finger for preventing relative longitudinal movement between the button catch and split ring, when the adapter, drill bit and extension are assembled together.

15. The combination of claim 14, wherein the holding means adjacent the distal end of the finger includes a pair of oppositely disposed tabs which converge upwardly above the outer curved surface of the finger in the direction of the upstanding button catch, the tabs being in overlapped, juxtaposed relation with the flanges, when the button catch is, in position, on the finger.

16. The combination of claim 15, wherein the button catch movement preventing means includes a detent projecting upwardly above the outer surface of the recess.

* * * * *